(12) United States Patent
Kupferman (10) Patent No.: US 6,934,104 B1
(45) Date of Patent: Aug. 23, 2005

(54) SERVO SYNCHRONIZATION BASED ON A SERVO SYNCH MARK THAT CONFLICTS WITH SELF-CLOCKING ENCODING ALGORITHMS

(75) Inventor: Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/857,553

(22) Filed: May 28, 2004

(51) Int. Cl.$^7$ ............................................. G11B 5/09
(52) U.S. Cl. .......................................... 360/51; 360/48
(58) Field of Search .................................... 360/48, 51

(56) References Cited

U.S. PATENT DOCUMENTS 5,162,791 A * 11/1992 Heegard ................... 340/825.5
6,178,056 B1 * 1/2001 Cloke et al. ................. 360/46
6,671,115 B2 * 12/2003 Haraguchi et al. ............ 360/48

FOREIGN PATENT DOCUMENTS

EP       0 553 409 A2    8/1993
EP         553409 A2 *   8/1993    ........... G11B 20/12

* cited by examiner

Primary Examiner—David Hudspeth
Assistant Examiner—Dismery Mercedes
(74) Attorney, Agent, or Firm—Blakely, Sokoloff, Taylor & Zafman (57) ABSTRACT

Disclosed is a rotatable media storage device (RMSD) that performs servo synchronization based on a servo synch mark (SSM) that conflicts with self-clocking encoding algorithms. The RMSD includes a disk having a plurality of tracks wherein each track comprises a plurality of data regions interspersed between servo wedges. The servo wedges comprise a servo synch mark field including a servo synch mark (SSM) and a track identification field including a track identifier (TKID). The TKID is encoded in accordance with a self-clocking encoding algorithm whereas the SSM is encoded in accordance with a second algorithm that conflicts with the self-clocking encoding algorithm of the TKID. Thus, the SSM is prevented from being decoded as a portion of the TKID.

28 Claims, 7 Drawing Sheets

SERVO SYNCHRONIZATION BASED ON A SERVO SYNCH MARK THAT CONFLICTS WITH SELF-CLOCKING ENCODING ALGORITHMS

BACKGROUND OF THE INVENTION

1. Field of the Invention

The present invention relates to rotating media storage devices (RMSDs). More particularly, the present invention relates to an RMSD that performs servo synchronization based on a servo synch mark (SSM) that conflicts with self-clocking encoding algorithms.

2. Description of the Prior Art and Related Information

Computer systems rely on rotating media storage devices (RMSDs), which often employ a moveable head actuator to frequently access large amounts of data stored on the media. One example of an RMSD is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the transducer head over a particular track on the disk to read or write information from and to that track, respectively.

Figure 1:
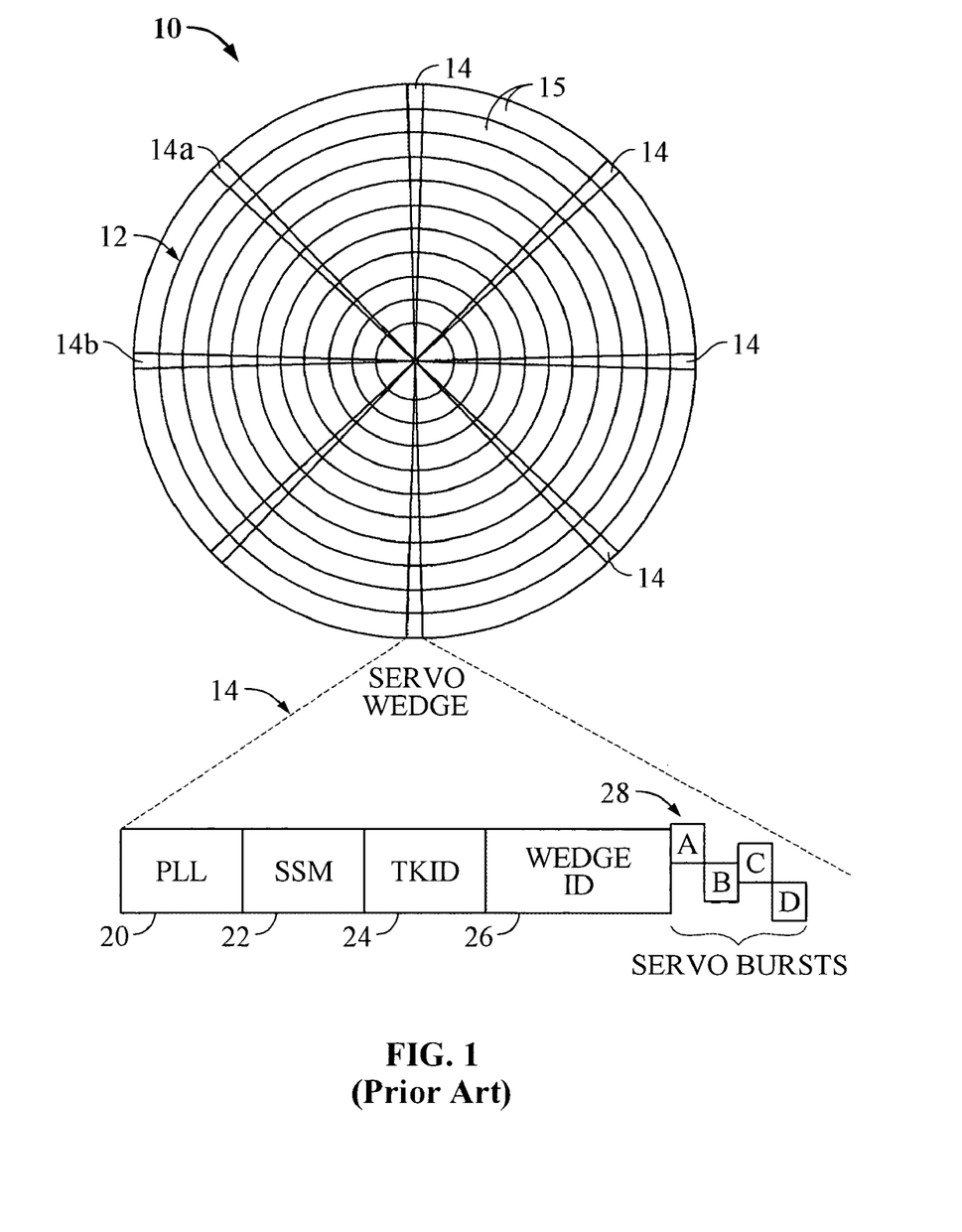
FIG. 1 shows an example of a prior art disk having a plurality of concentric tracks.

With reference to FIG. 1, FIG. 1 shows an example of a prior art disk 10 having a plurality of concentric tracks 12. Each surface of each disk 10 conventionally contains a plurality of concentric data tracks 12 angularly divided into a plurality of data sectors 15. In addition, special servo information is provided on each disk to determine the position of the moveable transducer head.

The most popular form of servo is called "embedded servo" wherein the servo information is written in a plurality of servo wedges 14a, 14b, etc. that are angularly spaced from one another and are interspersed between data sectors 15 around each track of each disk.

Each servo wedge 14 typically includes a phase lock loop (PLL) field 20, a servo synch mark (SSM) field 22, a track identification (TKID) field 24, a wedge ID field 26 having a binary encoded wedge ID number to identify the wedge, and a group of servo bursts (e.g. ABCD) 26 (e.g. an alternating pattern of magnetic transitions) which the servo control system samples to align the moveable transducer head with or relative to a particular track.

Typically, the servo control system moves the transducer head toward a desired track during a coarse "seek" mode using the TKID field as a control input. However, in processing information, it is necessary to ensure consistency in the detection of bits composing a block of bits. One common approach directed to ensuring such consistency employs multiple stored fields including a phase lock loop (PLL) field 20 to facilitate bit synchronization and a synch field to facilitate block synchronization. The synch mark field facilitates block synchronization by holding a special marker that is detected to "frame" data, i.e., to identify a boundary of a block. In contemporary hard disk drives employing embedded servos, it is well known to provide framing of servo data via a servo synch mark (SSM) field 22.

Generally, in hard disk drives, a servo synchronization signal based on the head reading a servo synchronization mark (SSM) results in a read/write channel of the disk drive establishing a precise timing reference point for read/write operations.

Once the transducer head is generally over the desired track, the servo control system uses the servo bursts (e.g. ABCD) 28 to keep the transducer head over that track in a fine "track follow" mode. During track following mode, the moveable transducer head repeatedly reads the wedge ID field 26 of each successive servo wedge 14 to obtain the binary encoded wedge ID number that identifies each wedge of the track. In this way, the servo control system continuously knows where the moveable head is relative to the disk.

As previously discussed, a servo synchronization signal based on the head reading a servo synchronization mark (SSM) 22 typically causes a read/write channel of a disk drive to establish a precise timing reference point for any read/write operations. Thus, it is important that the servo synchronization signal be robust and timely. To that end, the SSM pattern should be unique such that it will not be identified in other areas of the servo wedge. Particularly, it is important that the SSM pattern not be mistakenly identified as the TKID field 24, the wedge ID field 26, the servo bursts (e.g. ABCD) 28, etc.

Typically in most disk drives, the SSM 22, the TKID 24, and the wedge ID 26 are all recorded and encoded in accordance with a self-clocking encoding algorithm on the disk. Self-clocking encoding algorithms provide an encoding method in which data as well as clocking is integrated into one encoded pattern. One of the most commonly used types of self-clocking encoding algorithms is Manchester encoding.

Figure 2:
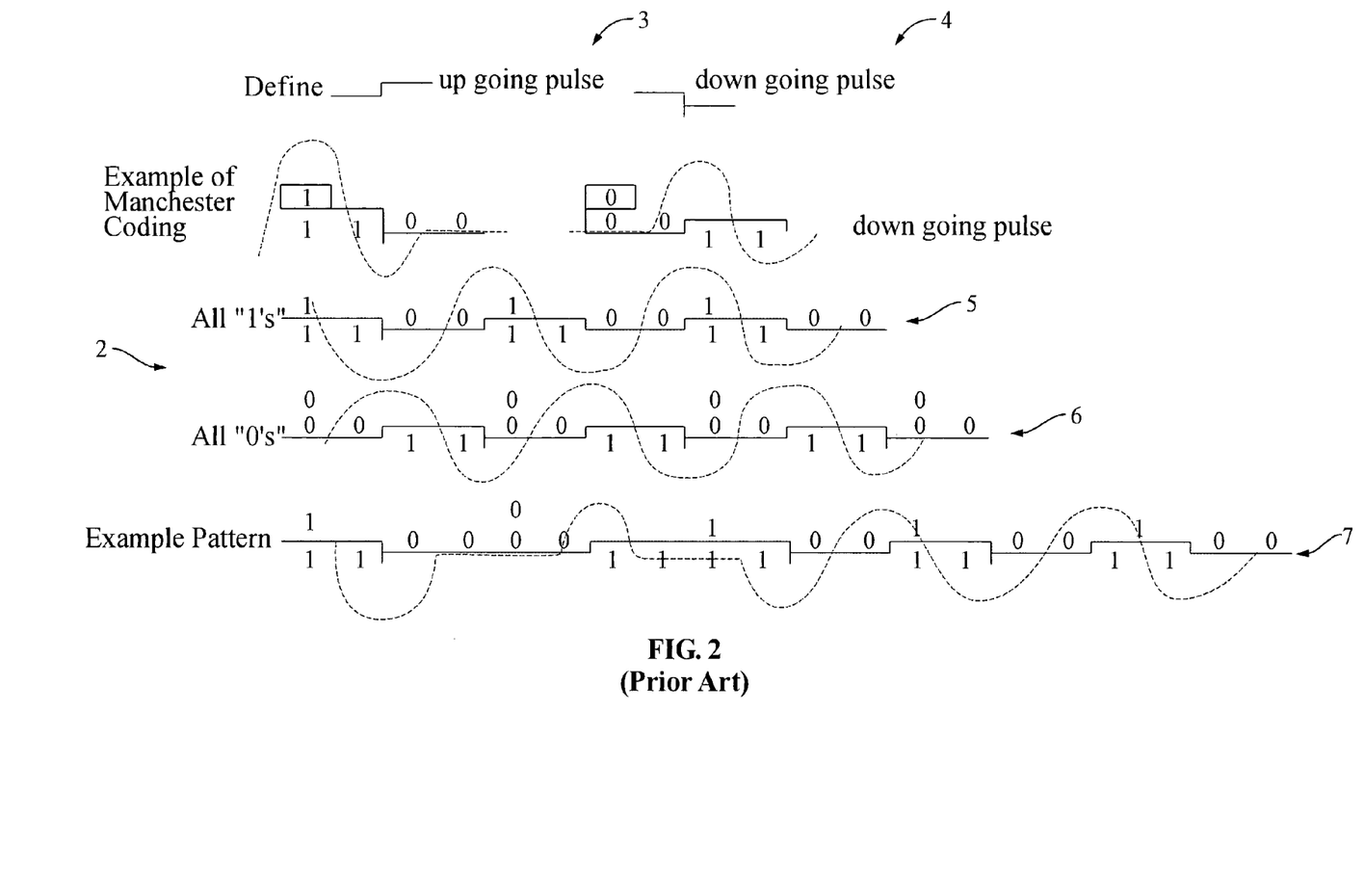
FIG. 2 illustrates an example of Manchester encoding.

Turning now to FIG. 2, FIG. 2 illustrates an example 2 of Manchester encoding. As can be seen in FIG. 2, Manchester encoding defines the time required to define a bit into two cycles. In one example 3, an up-going pulse, defines a data value of "1" by having a first cycle of positive bits (1, 1) followed by a down-cycle of zero bits (0,0). A series of all data "1's" in accordance with Manchester encoding can be seen in pattern 5. The dashed lines represent the read-back signal generated by the head of the disk drive as it reads the encoded pattern. Conversely, as shown in example 4, a data value of "0" in Manchester encoding can be defined as a down-going pulse having a first cycle of two zero bits (0,0) followed by an up-cycle of positive bits (1, 1). A series of all data "0's" in accordance with Manchester encoding can be seen in pattern 6. The dashed lines represent the read-back signal generated by the head of the disk drive as it reads the encoded pattern. Further, an example pattern of data bits, e.g. 1, 0, 1, 1, 1 in accordance with Manchester encoding, as recorded on the disk, can be seen as example pattern 7. Again, the dashed lines represent the read-back signal generated by the head of the disk drive as it reads the encoded pattern. It should be appreciated that this is one example of Manchester encoding and other variations are possible.

In current disk drives, this type of self-clocking Manchester encoding is typically used in encoding the SSM 22, the TKID 24, and the wedge ID 26. Because the SSM, the TKID, and the wedge ID all utilize the same self-clocking Manchester encoding algorithm, they are more likely to be misrecognized as one another.

However, if the SSM pattern is mistakenly identified in one of the other areas of the servo wedge, read/write operations may be compromised resulting in the wrong data being read, or, data being written to areas of the disk that is not supposed to be. Unfortunately, due to the fact that all of these various servo wedge components utilize the same self-clocking Manchester encoding algorithm, there is a greater likelihood that the SSM pattern will be misrecognized in other areas of the servo wedge.

SUMMARY OF THE INVENTION

The present invention relates to servo synchronization based on a servo synch mark (SSM) that conflicts with self-clocking encoding algorithms in a rotating media storage device (RMSD).

In one aspect, the invention may be regarded as an RMSD including a disk. The disk includes a plurality of tracks wherein each track comprises a plurality of data regions interspersed between servo wedges. The servo wedges comprise a servo synch mark field including a servo synch mark (SSM) and a track identification field including a track identifier (TKID). The TKID is encoded in accordance with a self-clocking encoding algorithm whereas the SSM is encoded in accordance with a second algorithm that conflicts with the self-clocking encoding algorithm of the TKID. Thus, the SSM is prevented from being decoded as a portion of the TKID.

In one embodiment, the RMSD may further include a head and a synch mark detection circuit. The synch mark detection circuit includes a synch mark detection mode in which the synch mark detection circuit validates a servo synchronization signal based on the head detecting an encoded pattern of the SSM that conflicts with the self-clocking encoding algorithm of the TKID. The synch mark detection circuit typically reads an encoded pattern of the SSM and decodes the encoded pattern of the SSM. In one embodiment, the synch mark detection circuit further comprises a matched filter to match the encoded pattern of the SSM with a SSM validation pattern in order to validate the servo synchronization signal. Further, a read/write channel may decode an encoded pattern of the TKID.

In one embodiment, at least some of the servo wedges may include a wedge identifier (ID) having an encoded pattern that is in accordance with the self-clocking encoding algorithm of the TKID. The SSM may or may not be located adjacent to the TKID. In one embodiment, the self-clocking encoding algorithm of the TKID is compatible with a Manchester encoding scheme. Further, in one embodiment, the encoding algorithm of the SSM conflicts with the Manchester encoding scheme.

In a further aspect, the invention may be regarded as a method for performing servo synchronization in a RMSD including a disk having a plurality of tracks wherein each track comprises a plurality of data regions interspersed between servo wedges. The servo wedges may include a servo synch mark field including a servo synch mark (SSM) and a track identification field including a track identifier (TKID). The TKID is encoded in accordance with a self-clocking encoding algorithm and the SSM is encoded in accordance with a second algorithm that conflicts with the self-clocking encoding algorithm. The method includes monitoring for the SSM. The method further includes detecting a pattern of an SSM that conflicts with the self-clocking encoding algorithm of the TKID.

In yet another aspect, the invention may be regarded as a computer system including a host computer and an RMSD, in which the RMSD includes a disk having a plurality of tracks, wherein each track includes a plurality of data regions interspersed between servo wedges. The servo wedges include a servo synch mark field including a servo synch mark (SSM) and a track identification field including a track identifier (TKID). The TKID is encoded in accordance with a self-clocking encoding algorithm whereas the SSM is encoded in accordance with a second algorithm that conflicts with the self-clocking encoding algorithm of the TKID. Thus, the SSM is prevented from being decoded as a portion of the TKID.

The foregoing and other features of the invention are described in detail in the Detailed Description and are set forth in the appended claims.

DETAILED DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention. Moreover, embodiments of the invention will be described in particular embodiments but may be implemented in hardware, software, firmware, middleware, or a combination thereof.

Figure 3:
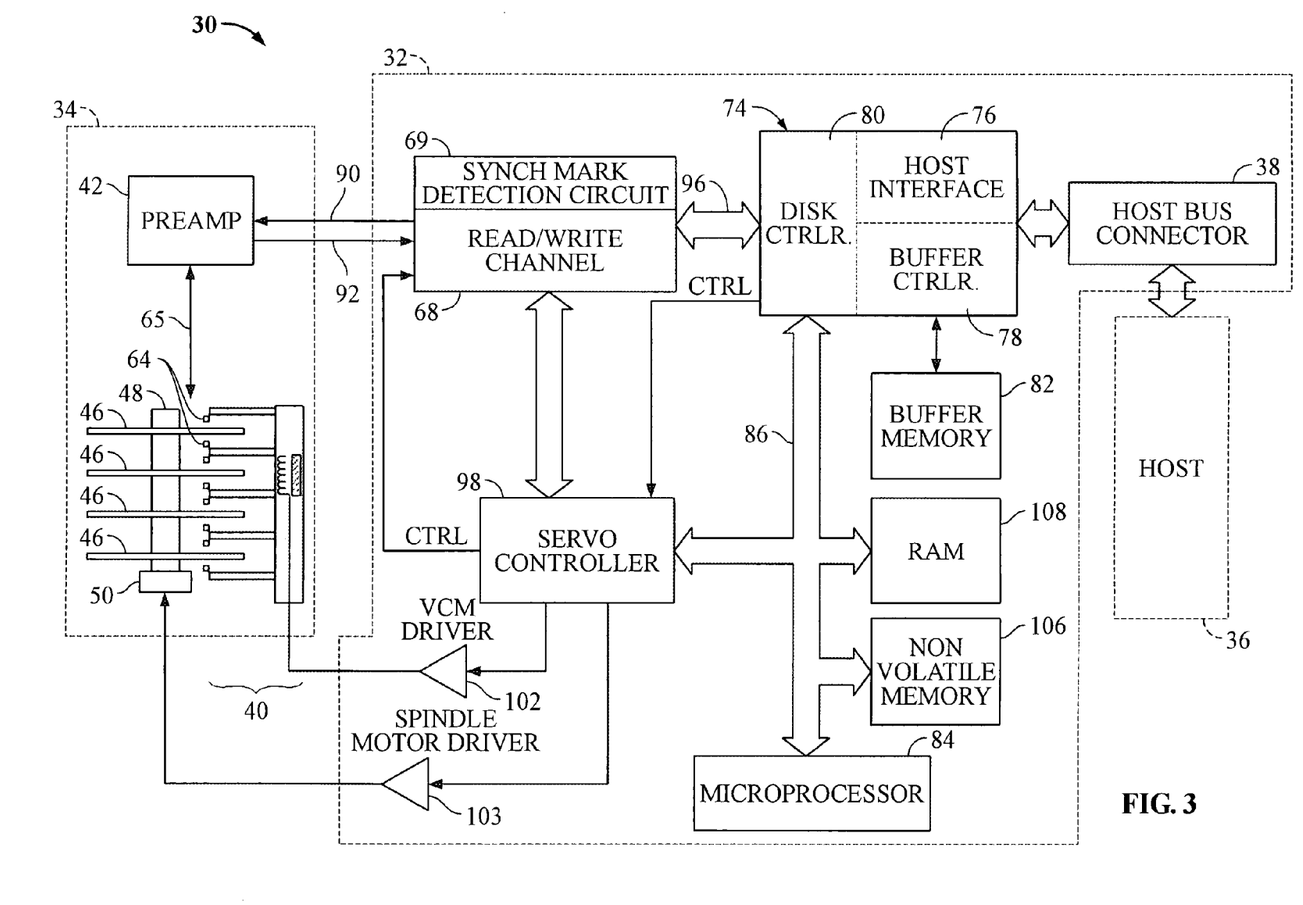
FIG. 3 shows a block diagram of a rotating media storage device (RMSD), such as a disk drive 30, in which embodiments of the invention may be practiced.

FIG. 3 shows a block diagram of a rotating media storage device (RMSD), such as a disk drive 30, in which embodiments of the invention may be practiced. One suitable standard for such connection is the Advance Technology Attachment (ATA) standard presently favored for desktop personal computers. Disk drive 30 comprises a Head/Disk Assembly, HDA 34, and a controller printed circuit board assembly, PCBA 32.

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller HIDC 74, voice coil motor driver VCM 102, spindle motor driver SMD 103, microprocessor 84, and several memory arrays—buffer or cache memory 82, RAM 108, and non-volatile memory 106.

Read/write channel 68 may include a servo synch mark detection circuit 69, which under the control of a program or routine, may execute methods or processes in accordance with embodiments of the invention to perform servo synchronization based on a servo synch mark that conflicts with self-clocking encoding algorithms used for other components of the servo wedge as will be discussed. For example, servo synch mark detection circuit 69 may be an application specific integrated circuit (ASIC) or other suitable type of circuit. Further, microprocessor 84 may pre-program the servo synch mark detection circuit 69 and/or initialize the servo synch mark detection circuit with initial and operational values to perform servo synchronization validation techniques based on servo synch marks that conflict with self-clocking encoding algorithms. Although the servo synch mark detection circuit 69 is shown as part of the read/write channel 68, it should be appreciated that it may be located elsewhere in the disk drive 30.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator 40 using a VCM driver 102 and to precisely control the rotation of spindle motor 50 with a spindle motor driver 103.

Preferably, disk drive 30 employs a sampled servo system in which equally spaced servo wedge sectors (sometimes termed "servo wedges") are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86. Further, as previously discussed, read/write channel 68 may include a servo synch mark detection circuit 69, which under the control of a program or routine, may execute methods or processes in accordance with embodiments of the invention to perform servo synchronization.

Figure 4:
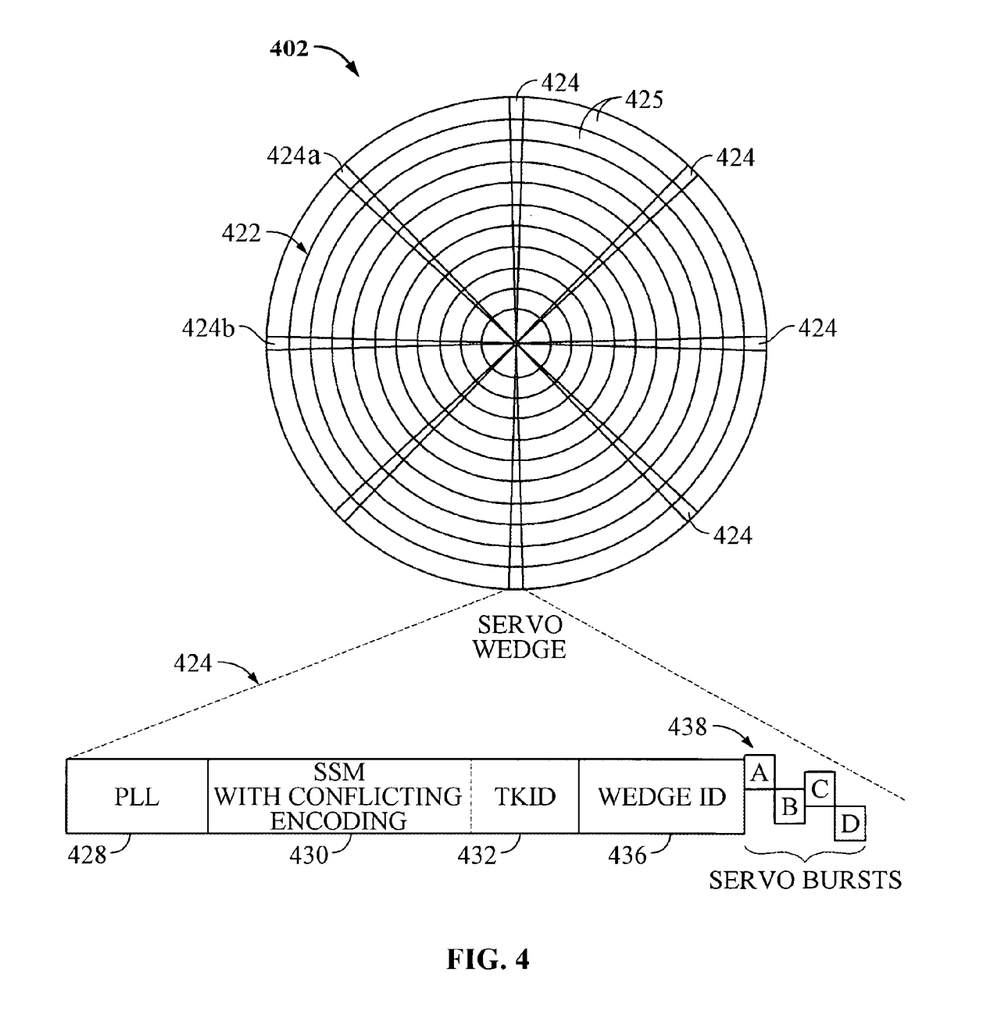
FIG. 4 shows a disk of a disk drive having a plurality of concentric tracks, and more particularly, illustrates a servo synch mark (SSM) that conflicts with the self-clocking encoding algorithm of the other components of the servo wedge, according to one embodiment of the present invention.

With reference also to FIG. 4, FIG. 4 shows a disk 402 of a disk drive having a plurality of concentric tracks, and more particularly, illustrates a servo synch mark (SSM) that conflicts with the self-clocking encoding algorithm of the other components of the servo wedge, according to one embodiment of the present invention. The disk 402 includes a plurality of concentric circumferential tracks 422. Each circumferential track 422 includes a plurality of embedded servo wedges 424 utilized in track following. The plurality of servo wedges 424 are spaced sequentially around a circumference of the circumferential track 422. For example, the embedded servo wedges 424a, 424b, etc., contain servo information utilized in track following and are interspersed between data regions 425 of the disk 402. Data is conventionally written in the data regions 425 in a plurality of discrete data sectors. Each data region 425 is typically preceded by a servo wedge 424.

Each servo wedge 424 includes a phase lock loop (PLL) field 428, a servo synch mark (SSM) field 430 having an SSM that includes a pattern that conflicts with self-clocking encoding algorithms, a track identification (TKID) field 432, a wedge identifier (ID) 436, and a group of servo bursts (e.g. ABCD) 438 (e.g. an alternating pattern of magnetic transitions) that the servo control system samples to align the moveable transducer head with, and relative to, a particular track.

The TKID 432, wedge ID 436, and servo bursts 438, in one embodiment, have encoded patterns in accordance with a self-clocking encoding algorithm, such as Manchester encoding, whereas the pattern of the SSM 430 is encoded with an algorithm that conflicts with self-clocking encoding algorithms, such as Manchester encoding.

Typically, the servo controller 98 moves the transducer head 64 toward a desired track during a coarse "seek" mode using the TKID field 432 as a control input. However, in processing information, it is necessary to ensure consistency in the detection of bits composing a block of bits. In order to ensure such consistency, the phase lock loop (PLL) field 428 is first read in order to facilitate bit synchronization. Next, the servo synch mark 430 is read to facilitate block synchronization. The SSM 430 facilitates block synchronization by acting as a special marker that is detected to "frame" data, i.e., to identify a boundary of a block. A valid servo synchronization signal results in the read/write channel 68 of the disk drive 30 establishing a precise timing reference point for read/write operations. It is well known to provide framing of servo data via a SSM 430. The wedge ID 436 is a binary encoded wedge ID number to identify the wedge.

Further, it should be noted that once the transducer head 64 is generally over a desired track 422, the servo controller 98 uses the servo bursts (e.g. ABCD) 438 to keep the transducer head 64 over the track in a find "track follow" mode. During track following mode, the moveable transducer head 64 repeatedly reads the wedge ID 436 of each successive servo wedge 427 to obtain the binary encoded wedge ID (e.g. encoded in accordance with Manchester encoding) number that identifies each wedge of the track. In this way, the servo controller 98 continuously knows where the head 64 is relative to the disk 402. In one example, a disk track 422 may have 256 wedges (e.g. 0–255) and may have a corresponding binary encoded wedge ID number (e.g. 00000000-11111111). Of course, it should be appreciated, that the disk may have any number of servo wedges and may utilize a wide variety of different encoding schemes.

As previously discussed, a valid servo synchronization signal, based on the head reading a SSM, typically causes the read/write channel 68 to establish a precise timing reference point for read/write operations. Thus, it is important that the servo synchronization signal be robust and timely.

In one embodiment, the present invention relates to servo synchronization techniques based on an SSM having a pattern which conflicts with patterns utilizing self-clocking encoding algorithms that are used by other components of the servo wedge. For example, the TKID 432, wedge ID 436, and servo bursts 438 may have patterns that are encoded in accordance with Manchester encoding, a type of self-clocking encoding algorithm.

In one particular embodiment, the TKID 432 is encoded in accordance with a self-clocking encoding algorithm whereas the SSM 430 is encoded in accordance with a second algorithm that conflicts with the self-clocking encoding algorithm of the TKID. In this way, the SSM 430 is prevented from being decoded as a portion of the TKID 432.

More particularly, in one embodiment, the read/write channel 68 may include a synch mark detection circuit 69. The synch mark detection circuit 69 may include a synch mark detection mode in which the synch mark detection circuit 69 validates a servo synchronization signal based on the head 64 detecting an encoded pattern of the SSM 430 that conflicts with the self-clocking encoding algorithm of the TKID 432. The synch mark detection circuit 69 typically reads an encoded pattern of the SSM 430 and decodes the encoded pattern of the SSM.

However, in one embodiment, the encoded pattern of the SSM 430 does not comply with a self-clocking encoding algorithm, such as Manchester encoding, whereas the rest of the components of the servo wedge such as the TKID 432, wedge ID 436, and servo bursts 438 comply with a self-clocking encoding algorithm, such as Manchester encoding.

For example, the servo synch mark detection circuit 69, under the control of a program or routine, may execute methods or processes in accordance with the embodiments of the invention to perform servo synchronization based on the detection of SSM's 430 that conflict with self-clocking encoding algorithms, such as Manchester encoding.

As will be discussed, in one embodiment, the synch mark detection circuit 69 may include a matched filter to match the encoded pattern of an SSM 430 with a SSM validation pattern in order to validate the servo synchronization signal. Further, the read/write channel 68 may decode encoded patterns of the TKID 432, wedge ID 436, servo bursts 438, which are encoded with self-clocking encoding algorithms, such as Manchester encoding.

Thus, in one embodiment, the self-clocking encoding algorithm of the TKID 432 is compatible with a Manchester encoding scheme whereas the encoding algorithm of the SSM 430 conflicts with the Manchester encoding scheme. Moreover, as previously discussed, other components of the servo wedge such as the wedge ID 436 and the servo bursts 438, as well as other components, may also utilize a self-clocking Manchester encoding algorithm. Also, it should be appreciated that the SSM 430 may or may not be located adjacent to the TKID 432 and that other arrangements of the components of the servo wedge may be utilized.

Figure 5:
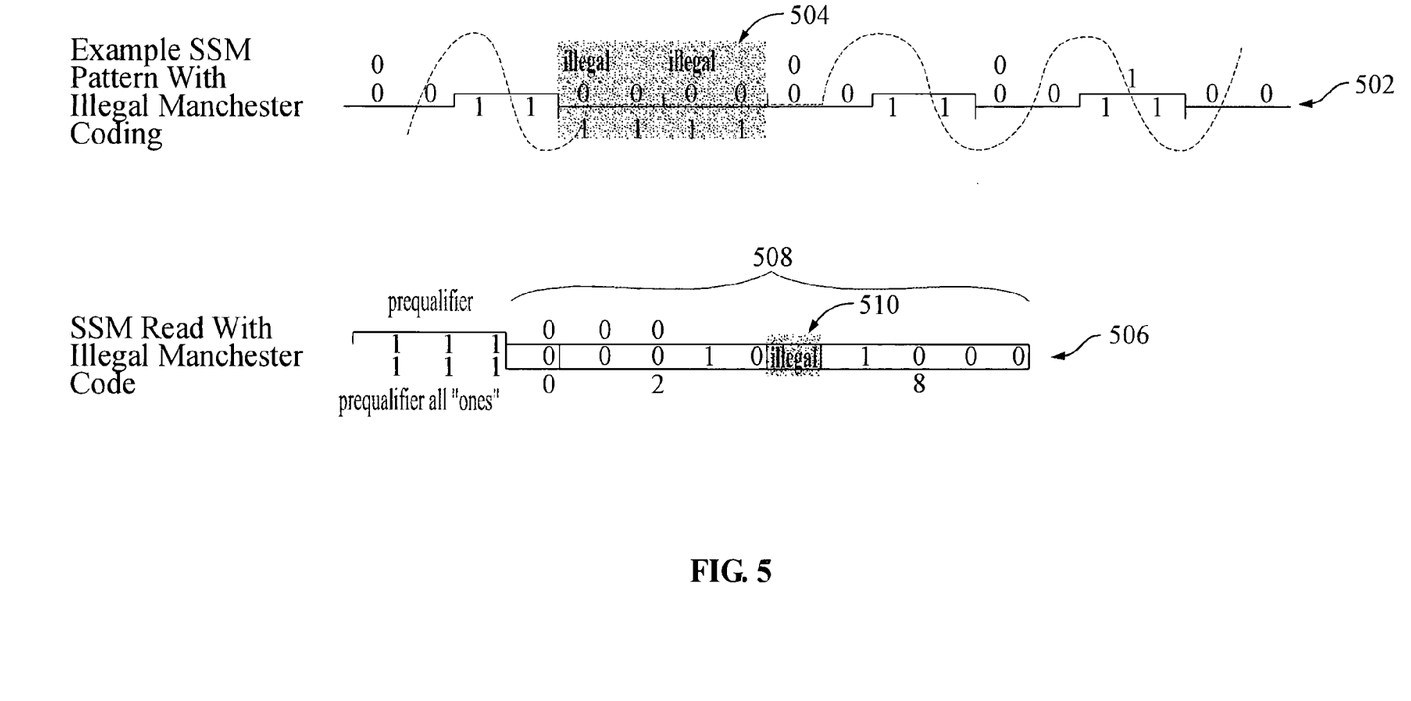
FIG. 5 is a diagram illustrating an example of an SSM pattern that conflicts with self-clocking encoding algorithms.

Turning now to FIG. 5, FIG. 5 is a diagram illustrating an example of an SSM pattern that conflicts with self-clocking encoding algorithms, such as the self-clocking Manchester encoding algorithm, typically used in RMSD's. Particularly, FIG. 5 illustrates a pattern 502 recorded on the disk mainly in accordance with the Manchester encoding algorithm representing values that may be received by the read/write channel from reading servo wedges and data wedges, but in the midst of this pattern 502, is a SSM pattern that conflicts with the self-clocking Manchester encoding algorithm.

More particularly, pattern 504, as seen in FIG. 5, may consist of a plurality of all "0's", (e.g. 0 0 0 0) or a plurality of all "1's" (e.g. 1 1 1 1). This SSM pattern 504 recorded on the disk is not self-clocking and therefore conflicts with self-clocking encoding algorithms. The dashed lines represent the read-back signal generated by the head of the disk drive, which is fed to the read-write channel, as it reads the encoded pattern.

For example, the read/write channel may decode a data pattern 506 that it receives including a pre-qualifier, and primarily Manchester encoded data 508. However, in the middle of the Manchester encoded data 508, is an SSM having a pattern 510, that conflicts with the self-clocking Manchester encoding algorithm.

Based on this, as previously discussed, the synch mark detection circuit will validate a servo synchronization signal based on the head detecting the encoded pattern 510 of the SSM that conflicts with the self-clocking Manchester encoding algorithm of the rest of the pattern 508, which may also include the TKID, the wedge ID, servo bursts, etc. The synch mark detection circuit typically reads the encoded pattern of the SSM and decodes the encoded pattern of the SSM and verifies that it conflicts with the self-clocking encoding algorithm (e.g. Manchester) of the other components of the servo wedge.

Figure 6:
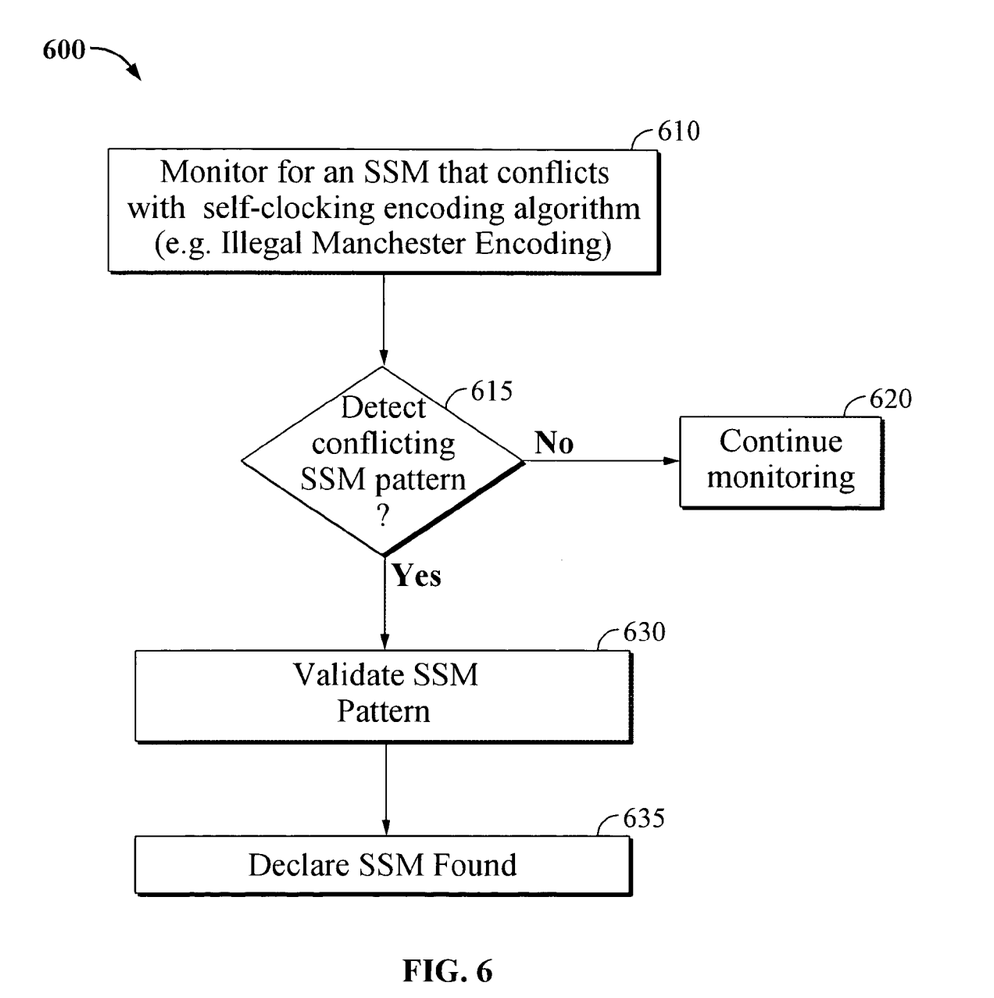
FIG. 6 is a flow chart of a method, according to one embodiment of the invention, for implementing servo synchronization techniques based on a servo synch mark (SSM) that conflicts with self-clocking encoding algorithms.

Now turning to FIG. 6, FIG. 6 is a flow chart of a method 600 of the invention for implementing servo synchronization techniques based on a servo synch mark (SSM) that conflicts with self-clocking encoding algorithms. At step 610, the method 600, implementable, for example, by a synch mark detection circuit, monitors for an SSM that conflicts with a self-clocking encoding algorithm (e.g. a Manchester encoding algorithm). Next, at step 615, it is determined whether a conflicting SSM pattern has been detected. If not, continued monitoring (step 620) is performed.

However, if an SSM that conflicts with a self-clocking encoding algorithm is detected, then the SSM pattern is validated (block 630) and it is declared that a valid SSM has been found (block 635). Thus, the servo synchronization signal has been validated.

Figure 7:
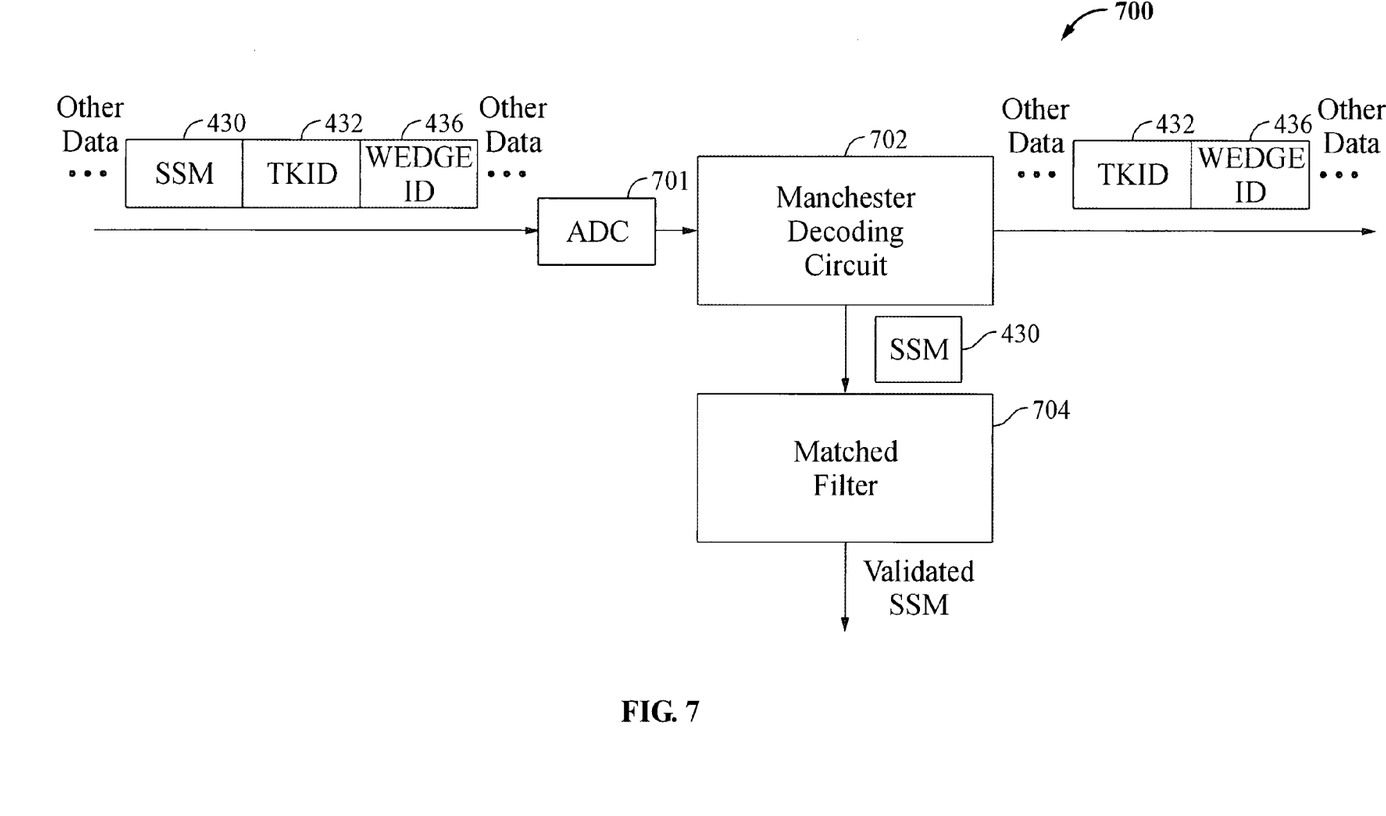
FIG. 7 is a block diagram of an example of a circuit that may be used in the synch mark detection circuit to validate a SSM, according to one embodiment of the present invention.

Turning now to FIG. 7, an example of a circuit that may be used in the synch mark detection circuit is illustrated. In one embodiment, the circuit 700 of the synch mark detection circuit may be utilized to detect an encoded pattern of the SSM that conflicts with a self-clocking encoding algorithm, and further may match the SSM with an SSM validation pattern, in order to further validate the SSM.

For example, a stream of data including SSM 430, TKID 432, wedge ID 436, and other data is fed through the circuit 700. The stream of data may first be processed by an analog-to-digital converter (ADC) 701 to digitize the signal. Next, the stream of data is fed through a Manchester decoding circuit 702. The Manchester decoding circuit 702 decodes patterns that are encoded in accordance with a Manchester encoding algorithm (i.e. a self-clocking encoding algorithm). If the patterns are Manchester encoded, then they are decoded by the Manchester decoding circuit, and continue on through the read/write channel and to the rest of the RMSD for further processing. As shown in FIG. 7, the TKID 432, wedge ID 436, along with other data, are decoded by the Manchester decoding circuit 702 and are passed on for further processing.

However, because SSM 430 conflicts with the self-clocking Manchester encoding algorithm, it cannot be decoded by the Manchester decoding circuit. The SSM 430 is therefore detected as not complying with the Manchester encoding algorithm and may be further passed on to a matched filter 704 for further validation. In this way, the SSM is prevented from being decoded as a portion of the TKID.

In one embodiment, the matched filter 704 may be utilized to match the encoded pattern of the SSM with a SSM validation pattern in order to further validate the SSM. If the encoded pattern of the SSM is matched by the matched filter with a pre-defined SSM validation pattern, then the SSM is validated and declared as a valid SSM. In this way, the servo synchronization signal is verified. If the SSM is not validated, it may be discarded as an invalid pattern.

For example, it should be appreciated that a series of 0's or 1's, as previously discussed, may be utilized as the SSM validation pattern in the matched filter. The SSM pattern may be of any suitable length so long as it conflicts with self-clocking encoding algorithms, such as Manchester encoding. Additionally, it should be appreciated that a wide variety of other different types of circuits to achieve this purpose should be apparent to those of skill in this art.

By performing servo synchronization based on detecting an SSM that conflicts with self-clocking encoding algorithms, such as Manchester encoding, which is utilized by the other components of the servo wedge, the chance of incorrectly validating a servo synchronization signal due to it being misrecognized as one of the other components of the servo wedge is significantly reduced. This is important because if an SSM pattern is misrecognized as another area of the servo wedge, read/write operations may be compromised resulting in the wrong data being read or data being written to areas of the disk that is not supposed to be.

The methods previously discussed can be employed for disk drives with an embedded servo system. However, numerous alternatives for RMSD's with similar or other media format characteristics can be employed by those skilled in the art to use the invention with equal advantage to implement these servo synchronization techniques. Further, although the embodiments have been described in the context of a disk drive with embedded servo sectors, the invention can be employed in many different types of RMSD's having a head actuator that scans the media.

I claim:

1. A rotating media storage device (RMSD) including a disk, the disk comprising:
    a plurality of tracks, each track comprising a plurality of data regions interspersed between servo wedges, the servo wedges comprising:
        a servo synch mark field including a servo synch mark (SSM);
        a track identification field including a track identifier (TKID);
        wherein the TKID is encoded in accordance with a self-clocking encoding algorithm and the SSM is encoded in accordance with a second algorithm that conflicts with the self-clocking encoding algorithm; and
        wherein the SSM is prevented from being decoded as a portion of the TKID.

2. The RMSD of claim 1, further comprising a head and a synch mark detection circuit having a synch mark detection mode, wherein, in the synch mark detection mode, the synch mark detection circuit validates a servo synchronization signal based on the head detecting an encoded pattern of the SSM that conflicts with the self-clocking encoding algorithm of the TKID.

3. The RMSD of claim 2, wherein the synch mark detection circuit further,
    reads an encoded pattern of the SSM; and
    decodes the encoded pattern of the SSM.

4. The RMSD of claim 3, wherein the synch mark detection circuit further comprises a matched filter to match the encoded pattern of the SSM with a SSM validation pattern in order to validate the servo synchronization signal.

5. The RMSD of claim 3, further comprising a read/write channel, wherein the read/write channel decodes an encoded pattern of the TKID.

6. The RMSD of claim 1, wherein at least some of the servo wedges further include a wedge identifier (ID) having an encoded pattern that is in accordance with the self-clocking encoding algorithm of the TKID.

7. The RMSD of claim 1, wherein the SSM is located adjacent to the TKID.

8. The RMSD of claim 1, wherein the SSM is not located adjacent to the TKID.

9. The RMSD of claim 1, wherein the self-clocking encoding algorithm of the TKID is compatible with a Manchester encoding scheme.

10. The RMSD of claim 1, wherein the encoding algorithm of the SSM conflicts with a Manchester encoding scheme.

11. A method for performing servo synchronization in a rotating media storage device (RMSD) including a disk having a plurality of tracks, each track comprising a plurality of data regions interspersed between servo wedges, the servo wedges including a servo synch mark field including a servo synch mark (SSM) and a track identification field including a track identifier (TKID), wherein the TKID is encoded in accordance with a self-clocking encoding algorithm and the SSM is encoded in accordance with a second algorithm that conflicts with the self-clocking encoding algorithm, the method comprising:
    monitoring for an SSM; and
    detecting a pattern of an SSM that conflicts with the self-clocking encoding algorithm of the TKID.

12. The method of claim 11, wherein detecting a pattern of an SSM that conflicts with the self-clocking encoding algorithm of the TKID further comprises:
    reading an encoded pattern of the SSM; and
    decoding the encoded pattern of the SSM.

13. The method of claim 12, wherein detecting a pattern of an SSM that conflicts with the self-clocking encoding algorithm of the TKID further comprises matching the encoded pattern of the SSM with a SSM validation pattern.

14. The method of claim 11, wherein at least some of the servo wedges further include a wedge identifier (ID) having an encoded pattern that is in accordance with the self-clocking encoding algorithm of the TKID.

15. The method of claim 11, wherein the SSM is located adjacent to the TKID.

16. The method of claim 11, wherein the SSM is not located adjacent to the TKID.

17. The method of claim 11, wherein the self-clocking encoding algorithm of the TKID is compatible with a Manchester encoding scheme.

18. The method of claim 11, wherein the encoding algorithm of the SSM conflicts with a Manchester encoding scheme.

19. A computer system comprising a host computer and a rotating media storage device (RMSD) connected to the host computer, the RMSD comprising:

a disk having a plurality of tracks, each track comprising a plurality of data regions interspersed between servo wedges, the servo wedges comprising:
- a servo synch mark field including a servo synch mark (SSM);
- a track identification field including a track identifier (TKID);
- wherein the TKID is encoded in accordance with a self-clocking encoding algorithm and the SSM is encoded in accordance with a second algorithm that conflicts with the self-clocking encoding algorithm; and
- wherein the SSM is prevented from being decoded as a portion of the TKID.

20. The computer system of claim 19, further comprising a head and a synch mark detection circuit having a synch mark detection mode, wherein, in the synch mark detection mode, the synch mark detection circuit validates a servo synchronization signal based on the head detecting an encoded pattern of the SSM that conflicts with the self-clocking encoding algorithm of the TKID.

21. The computer system of claim 20, wherein the synch mark detection circuit further, reads an encoded pattern of the SSM; and
decodes the encoded pattern of the SSM.

22. The computer system of claim 21, wherein the synch mark detection circuit further comprises a matched filter to match the encoded pattern of the SSM with a SSM validation pattern in order to validate the servo synchronization signal.

23. The computer system of claim 21, further comprising a read/write channel, wherein the read/write channel decodes an encoded pattern of the TKID.

24. The computer system of claim 19, wherein at least some of the servo wedges further include a wedge identifier (ID) having an encoded pattern that is in accordance with the self-clocking encoding algorithm of the TKID.

25. The computer system of claim 19, wherein the SSM is located adjacent to the TKID.

26. The computer system of claim 19, wherein the SSM is not located adjacent to the TKID.

27. The computer system of claim 19, wherein the self-clocking encoding algorithm of the TKID is compatible with a Manchester encoding scheme.

28. The computer system of claim 20, wherein the encoding algorithm of the SSM conflicts with a Manchester encoding scheme.

* * * * *